(No Model.) 2 Sheets—Sheet 1.

P. ASHBERRY & W. BARNES.
ANIMAL SHEARS.

No. 479,109. Patented July 19, 1892.

Witnesses
Rob't F. Drury
Ensor D. Drury

Inventors
Philip Ashberry
Walter Barnes

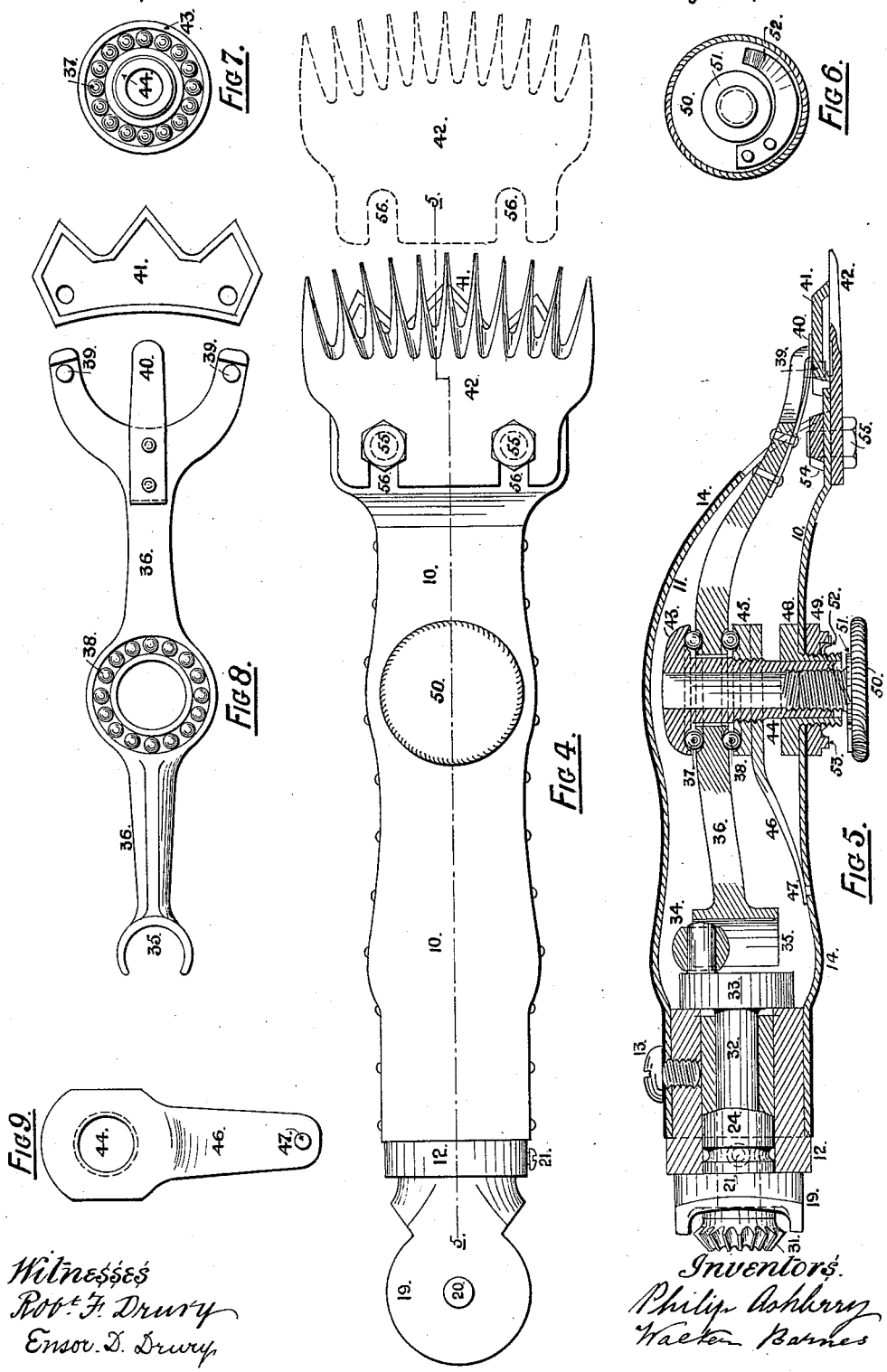

UNITED STATES PATENT OFFICE.

PHILIP ASHBERRY AND WALTER BARNES, OF SHEFFIELD, ENGLAND.

ANIMAL-SHEARS.

SPECIFICATION forming part of Letters Patent No. 479,109, dated July 19, 1892.

Application filed March 29, 1892. Serial No. 426,941. (No model.) Patented in England June 22, 1891, No. 10,572.

*To all whom it may concern:*

Be it known that we, PHILIP ASHBERRY and WALTER BARNES, subjects of the Queen of Great Britain, and residents of Sheffield, in the county of York, England, have invented a new and useful Improvement in Mechanical Clippers, (patented in part to us in Great Britain by Letters Patent No. 10,572, dated the 22d day of June, 1891,) of which the following is a specification.

This invention is additional to our improvements in mechanical clippers for sheep and other animals set forth in a previous specification forming part of an application for Letters Patent of the United States of America, filed March 31, 1891, Serial No. 387,149.

The improved clipper which is the subject-matter of our present invention embodies several novel combinations and arrangements of parts hereinafter set forth and claimed, having the following objects, viz: first, to provide in a simple and effective way for increasing or decreasing the pressure of the cutter upon the comb, hereinafter termed its "tension," by adjusting the cutter-carrier or driving-arm without bringing any relatively fixed part into contact with said arm and so that the tension of the cutter can be so regulated without opening the casing of the clipper; secondly, to provide for tightening the cutter through the medium of a tension-spring and at the same time to prevent or counteract any tilting of the arm; thirdly, to combine in one part a tension-spring and a necessary lock-nut; fourthly, to simplify to the utmost the working parts between the driving-crank and the cutter, and, fifthly, to facilitate coupling and uncoupling the clipper to and from the flexible shaft with the latter in motion.

Two sheets of drawings accompany this specification as parts thereof.

Figure 2:
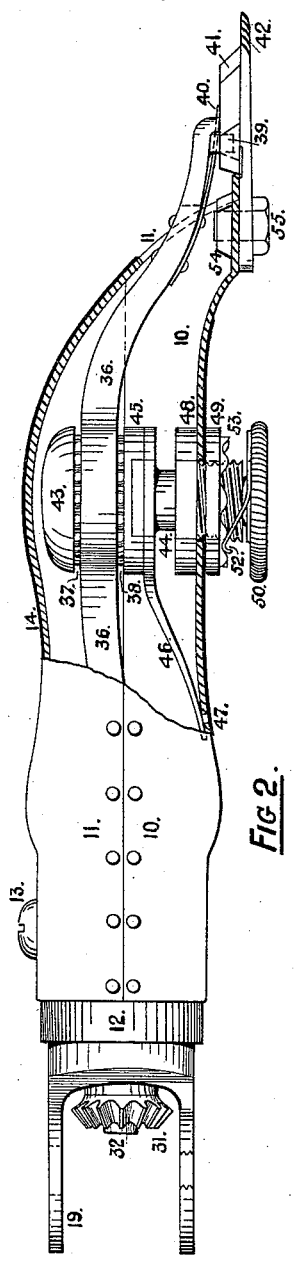
Figure 1:
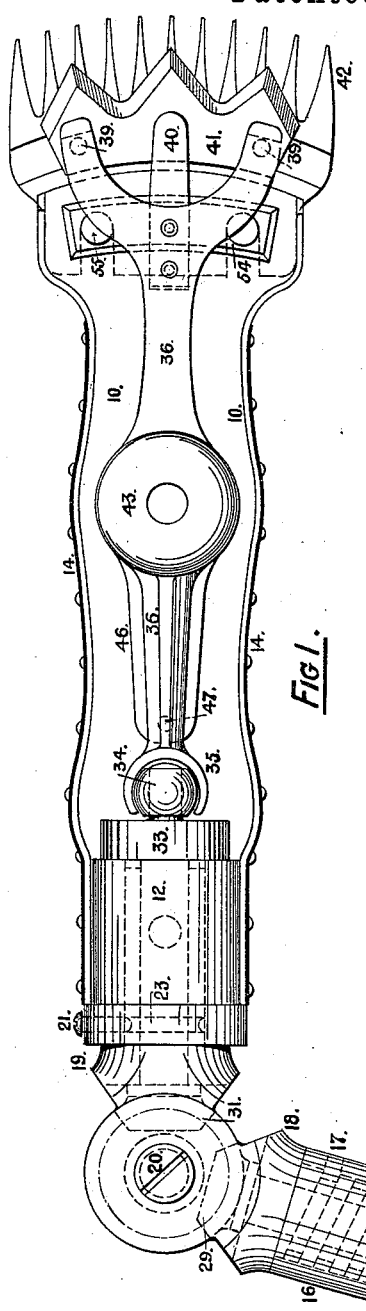
Figure 3:
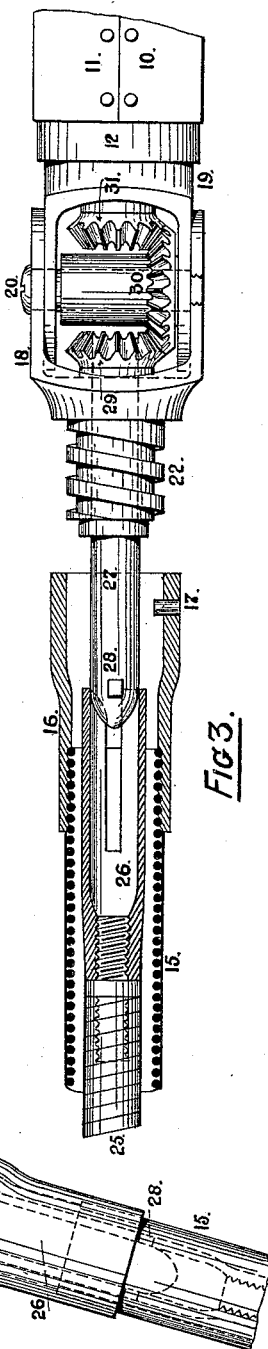

Figure 1 of the drawings is a top view of the improved clipper with its cap removed. Fig. 2 is a side view with portions broken away and omitted. Fig. 3 is an elevation, partly in section, illustrating the coupling and uncoupling operations. Fig. 4 is a back view illustrating the detaching and attaching of the comb. Fig. 5 is a longitudinal section on the line 5 5, Fig. 4. Fig. 6 is a top view of the tension-screw. Fig. 7 is an end view of the center post, showing the upper ball-bearing of the cutter-driving arm. Fig. 8 is a corresponding bottom view of said arm and of the cutter detached therefrom, showing the balls of its lower bearing; and Fig. 9 is a bottom view of the combined tension-spring and lock-nut detached.

Like reference-numbers indicate corresponding parts in the several figures.

The terms "top" and "bottom" and the like have been and will be used with reference to the relative positions of the parts indicated by Figs. 1 and 4 as top and bottom views, respectively, and as shown in Figs. 2 and 5.

The customary combined handle and casing, hereinafter termed the "handle-casing," is composed of a bottom or main part 10 and a top part or cap 11, united by a bushing 12, Fig. 1, fast in the shaft end of the main part, and a screw 13, Fig. 2, inserted through a hole in the cap into a vertical hole in said bushing. Those portions of said main part and cap which are grasped by the hand are preferably provided with non-metallic coverings 14 of thin leather or the like, attached by cement and small rivets. A non-rotary shaft-casing 15, Figs. 1 and 3, terminates in a socket 16, having an inwardly-projecting radial stud 17, and is coupled endwise to the handle-casing by two joint-pieces 18 19, a pivot-bolt 20, and a set-screw 21, constituting, in connection with said bushing 12 of the handle-casing, a swiveled knuckle-joint. Said joint-piece 18 terminates in a screw-plug 22, having a quick thread, which fits into said socket 16 and coacts with said stud 17 to rigidly connect the shaft-casing with said joint-piece. Said bolt 20 pivotally connects the two joint-pieces, and said set-screw 21, inserted radially through a tapped hole in the protruding end of the bushing 12, coacts with a circumferential groove 23, Figs. 1 and 5, in the cylindrical terminal 24 of said joint-piece 19, which is thus fastened within said bushing, while the latter is free to turn independently thereon, together with the handle-casing. The flexible driving-shaft 25 within said casing 15 has a hollow deeply-notched terminal 26, which engages endwise with the rear end of a spindle 27 and with a pair of lugs 28 on said spindle, as illustrated by Figs. 1 and 3. Upon the shouldered front end of said spindle a bevel-gear 29 is screwed fast within said joint-piece 18. An intermeshing bevel-gear 30, with a sleeve-hub, is loose on said pivot-bolt 20, and a third gear 31, is in mesh with said gear 30, is screwed on the shouldered rear end of a short crank-shaft 32, which rotates within said terminal 24 of said joint-piece 19 and carries at its front end a crank-disk 33 within the handle-casing. A spherical roller 34 on the crank-pin of said disk 33 works within a vertically-extended cylindrical socket 35 at the rear end of a lever or "arm" 36, which is pivoted at mid-length by two horizontal circles of anti-friction balls 37 38 and carries at its protruding front end a pair of studs 39 and a central spring-finger 40, by which it drives the reciprocating cutter 41 and holds the same down upon the relatively stationary comb 42. The anti-friction balls 37 38 are supported, respectively, by a grooved fixed flange 43 at the top of a vertical post 44, Figs. 1, 2, 4, and 7, and by a grooved collar 45, screwed upon said post beneath the arm 36. A combined tension-spring and lock-nut 37, screwed upon the post 44 beneath the collar 45, keeps the latter in place and by its rearwardly-projecting spring end counteracts any tilting effect of said spring-finger 40 and assists to render the pressure of the cutter upon the comb elastic. A stud 47 at the extremity of said spring end coacts with an indentation in the bottom of said main part 10 of the handle-casing to keep the spring end central. The lower end of the post 44 is smooth externally and fits into the upper end of a bushing composed of a flanged sleeve 48 and a nut-ring 49 at the bottom of the handle-casing, as best seen in Fig. 5. This end of said post 44 is internally threaded to receive and coact with a hand-screw 50, Figs. 2, 4, and 6, hereinafter termed the "tension-screw," the milled head of which is provided with a raised face 51, that coacts with the lower end of said bushing-sleeve 48 when the screw is home, and is further provided with a detent-spring 52, which coacts with an indented crown-flange 53 on said nut-ring 49. By tightening the tension-screw one notch or more the post 44, and therewith the arm 36, is drawn bodily downward and the tension of the spring-finger 40 and the spring end of the combined tension-spring and lock-nut 46, and consequently that of the cutter 41, is increased more or less, as required, or by turning the tension-screw backward the pressure of the cutter on the comb is reduced, if need be. Such adjustments can be readily and quickly made without opening the handle-casing and with the cutter in motion, and at the same time there is no tilting such as could cause any part to bind and the cutter-driving arm vibrates freely in all its positions without contact with any relatively stationary part or surface.

To render the comb 42 and cutter 41 removable at will without opening the handle-casing, a double nut 54 rests upon a flat front portion of the bottom of said main part 10 of the casing, a pair of screws 55 are inserted upward into said nut through said bottom, and the heel end of the comb is provided with open slots 56, Fig. 4, by means of which it is readily engaged with said screws or disengaged therefrom by simply loosening the screws, as illustrated by dotted lines in Figs. 4 and 5. When the comb is removed from the inverted clipper, as in dotted lines in Fig. 4, the cutter may be lifted off the studs 39 and spring-finger 40 of the arm 36, as in Fig. 8, and both parts may be thus removed and replaced in a moment.

To instantly stop the cutter preparatory to removing the comb or for any other purpose, it is only necessary to give the knuckle-joint 18 19 one or two unscrewing turns relative to the shaft-casing 15 16 and to separate the latter, and therewith the inclosed shaft 25 26, endwise from the spindle 27 28, as in Fig. 3. The shaft and spindle are instantly recoupled by simply inserting the spindle into the shaft-terminal 16, the friction in the knuckle-joint being sufficient to cause it to turn with the spindle until the joint-piece 18 is screwed tight. When the parts are united, as in Fig. 1, the customary rapid motion is transmitted from the shaft 15 16 through the spindle 17 18, gearing 29 31, crank-shaft and crank 32 34, and vibrating arm 36 39 to the reciprocating cutter 41 in a smooth and positive manner, and the handle-casing, together with the parts carried thereby, may be moved into any required position without interfering with the cutter-driving motion and with comparatively few and limited movements of the shaft-casing.

The saving of time and of strength effected by the improvements above set forth is of very great importance to sheep-shearers, especially for whose use the improved clipper is primarily intended.

Details which have not been specified may be of any approved description, and we do not limit our respective claims as to details of construction and arrangement, except as therein expressly stated.

Having thus described the said improved clipper, we claim as our invention and desire to patent under this specification—

1. In a mechanical clipper, the combination, with a handle-casing carrying a horizontal comb and with a reciprocating cutter superposed upon said comb, of a horizontal arm carrying vertical studs which drive the cutter and a spring-finger to press upon the cutter, two circles of anti-friction balls, between which said arm vibrates, and tension-regulating devices which comprise a vertically-movable pivot-post carrying supports for said balls and a tension-screw for adjusting said post endwise, substantially as hereinbefore specified.

2. In a mechanical clipper of the kind hereinbefore specified, the combination, with the reciprocating cutter and handle-casing, and with a cutter-driving arm carrying a spring-finger to press upon said cutter, and a vertically-movable post supporting the bearings of said arm, of a rearwardly-projecting tension-spring attached to said post and coacting at its rear end with the bottom of said casing, for the purpose set forth.

3. The combined tension-spring and lock-nut 46, in combination with the handle-casing and with the vertically-movable post 44, having the flange 43 and collar 45, the two circles of balls 37 38, supported by said post, and the cutter-driving arm 36, which vibrates between said circles of balls, substantially as hereinbefore specified.

4. In combination with the vertically-adjustable post 44 and the two horizontal circles of anti-friction balls 37 38, supported by said post, and with the crank-disk 33, having its crank-pin provided with the spherical roller 34, the cutter-driving arm 36, having at its respective ends the vertically-extended cylindrical socket 35 and studs 39, substantially as hereinbefore specified.

5. In combination with the flexible shaft 25, having the deeply-notched hollow terminal 26, and the spindle 27, having the lateral studs 28, the non-rotary shaft-casing 15, having the socket 16, provided with the inwardly-projecting stud 17, and the joint-piece 18, having the plug end 22 fitted to said socket and provided with a quick screw-thread to coact with said stud, substantially as hereinbefore specified.

PHILIP ASHBERRY.
WALTER BARNES.

Witnesses:
ROBT. F. DRURY,
ENSOR D. DRURY.